Figure 1:
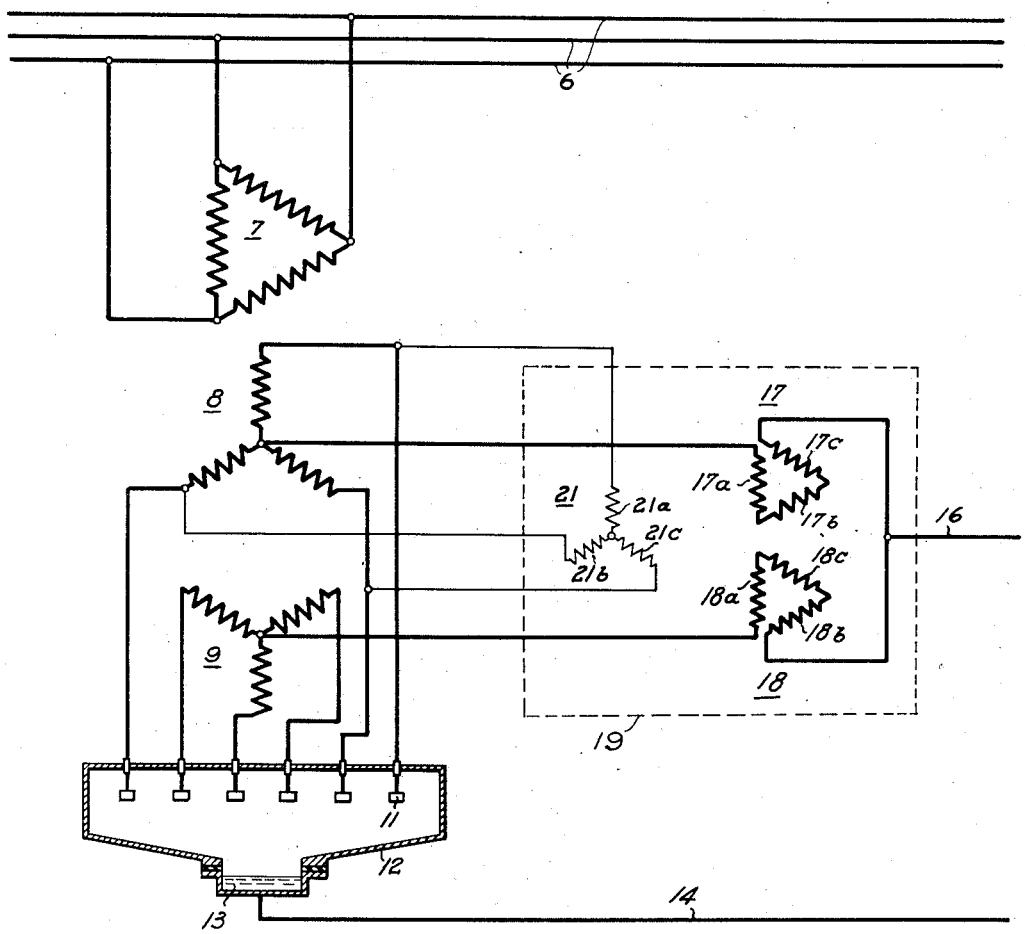

April 30, 1935. H. WINOGRAD 1,999,746
RECTIFIER TRANSFORMER
Filed Oct. 25, 1933

Inventor
H. Winograd
by G. J. DeWein
Attorney

Patented Apr. 30, 1935

1,999,746

UNITED STATES PATENT OFFICE 1,999,746

RECTIFIER TRANSFORMER

Harold Winograd, Milwaukee, Wis., assignor to Allis-Chalmers Manufacturing Company, Milwaukee, Wis., a corporation of Delaware Application October 25, 1933, Serial No. 695,157

7 Claims. (Cl. 175—363)

This invention relates to improvements in electric current converting systems, and more particularly to means for insuring the normal operation of an interphase transformer forming a part of such system even when operating conditions tend to disturb such operation.

In electric current rectifying systems, use is frequently made of interphase transformers, which are auto-transformers connecting a direct current line with a plurality of supply circuits having the same average voltage but presenting alternating current voltage components which are not in phase coincidence. Such interphase transformers cause the simultaneous flow of current at every instant in the several supply circuits but do not control the current distribution therebetween. The interphase transformers are designed for a predetermined current distribution which is maintained under normal operating conditions as a result of the connection utilized, but become ineffective when such current distribution is disturbed. Such disturbance may result from such causes as the presence of certain harmonics in the voltages of the supply line, from dissymmetries in the reactances of the transformer windings or from abnormal operating conditions within the rectifier. The result of such disturbances is that the core of the interphase transformer receives a direct current flux component bringing such core to magnetic saturation, thereby rendering the interphase transformer ineffective, and the output voltage of the system departs from the normal value thereof.

By providing means for maintaining, within the core of the interphase transformer, an alternating current flux component of normal value even upon occurrence of direct current magnetization, the operation of the interphase transformer may be maintained in the normal manner thereof.

It is, therefore, among the objects of the present invention to provide an electric current converting system employing an interphase transformer, the operation of which is not affected by disturbances occuring in the system.

Another object of the present invention is to provide an electric current converting system employing an interphase transformer, the operation of which is not affected by changes in the current distribution between the several portions of the system joined thereby.

Another object of the present invention is to provide an electric current converting system employing an interphase transformer in which an alternating current magnetization is maintained at normal value during abnormal operating conditions tending to disturb such magnetization.

Another object of the present invention is to provide an electric current converting system employing an interphase transformer in which the interphase transformer remains operative when the current flowing therethrough is insufficient to magnetize the core thereof.

Figure 2:
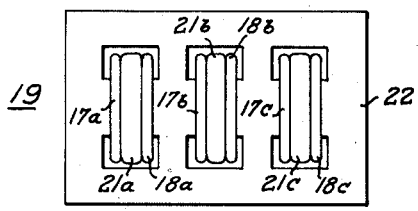

Objects and advantages other than those above described will be apparent from the following description when read in connection with the accompanying drawing, in which:

Fig. 1 diagrammatically illustrates one embodiment of the present invention in which a six phase alternating current rectifier is supplied from a three phase line; and Fig. 2 schematically illustrates the preferred construction of the interphase transformer utilized in the system illustrated in Fig. 1.

Referring more particularly to the drawing by characters of reference, reference numeral 6 designates a polyphase alternating current line energized to any desired voltage at any suitable frequency, and herein represented as a three phase line solely for the reason that such type of line is most frequently utilized in practice. Line 6 is connected with the primary winding 7 of a supply transformer provided with two secondary windings 8 and 9. Each secondary winding comprises a plurailty of phase displaced sections connected to form a neutral point and severally connected with the anodes 11 of an electron discharge device 12 having a cathode 13. Device 12 is represented as being of the metallic cathode arcing type but may be of any other type operable as an alternating current rectifier such as the vacuum, contact and electrolytic types. Cathode 13 is connected with one of the conductors 14 of a direct current output line having the second conductor 16 thereof connected with the neutral points of windings 8 and 9 through an interphase transformer 19. Interphase transformer 19 comprises two windings 17 and 18 severally connecting conductor 16 with the neutral points of windings 8 and 9 respectively and each comprising three phase displaced sections 17a, 17b, 17c and 18a, 18b and 18c, respectively. Such windings are assembled in inductive relation with the phase displaced sections of a star connected winding 21 energized from line 6 in any suitable manner to supply such winding with voltages in proper phase relation with the voltages of windings 8 and 9, as for instance, by energizing winding 21 from the terminals of winding 8. Windings 17, 18 and 21 are arranged on a three phase core structure 22 which is preferably of the type entering into the construction of transformers of the shell type as illustrated in Fig. 2.

The operation of the system will be understood from the following explanation. Assuming line 6 to be energized, winding 7 which is energized therefrom, induces voltages in windings 8 and 9 which constitute a six phase system of voltages. Winding 21 receives three phase voltages and draws, from line 6, magnetizing current having fundamental and harmonic components (other than triple harmonic components) to magnetize core 22 and thereby induce, in windings 17 and 18, three phase voltages of proportionate magnitudes. As a result of the delta or polygon connection of windings 17 and 18, however, such three phase voltages cancel each other in the circuits of such windings and do not appear at the terminals thereof. Such voltages are, therefore, without effect and need not be further considered.

Upon connection of current consuming devices (not shown) across line 14, 16, device 12 will deliver current to such devices, such current flowing in equal amounts through windings 17 and 18 in the absence of any cause tending to disturb the distribution of such currents. Under such conditions, and if the value of the load current is at least equal to the so-called critical load which is the minimum load required to cause operation of the interphase transformer, windings 8 and 9 will carry current simultaneously at every instant as a result of the arrangement of windings 17 and 18 on a common magnetic core. Interphase transformer 19 then maintains the voltage of line 14, 16 at the average value of the rectified voltages of the windings 8 and 9, the difference of the instantaneous voltages of windings 8 and 9 appearing as a third harmonic voltage across windings 17 and 18. A common third harmonic flux corresponding to such third harmonic voltage then links with windings 21, 17 and 18 but such flux component does not disturb the operation of winding 21 because the third harmonic voltage components induced by such flux component in the several sections of winding 21 cancel each other between terminals thereof. The magnetizing current producing such third harmonic flux component is supplied by the alternating current components of the currents in windings 17 and 18; such components are in phase opposition but their effects are additive due to the method of connection of windings 17 and 18. The greater part of the load current constitutes direct current components likewise flowing through windings 17 and 18, but such components tend to magnetize the core 22 in opposite directions and are, therefore, without effect on the magnetization of such core, provided that such components remain equal in magnitude. Under such conditions, interphase transformer 19 therefore operates in the same manner as interphase transformers known in the art.

If the currents flowing through windings 17 and 18 become unequal for any reason, the magnetizing effects of the direct current components thereof on the core 22 will no longer cancel each other and core 22 is subjected to a direct current magnetization which is generally sufficient to cause magnetic saturation thereof. The magnetic permeability of such core then is very much reduced and, in order to maintain therein the alternating current flux component necessary for the normal operation thereof, an alternating current magnetizing component would be required which would generally be considerably larger than the alternating current components obtainable from the load currents in windings 17 and 18. In the absence of winding 21, the alternating current flux component in core 22 would therefore become considerably reduced and interphase transformer 19 would become partly or totally ineffective. As a result of the direct current magnetization of core 22 and of the star connection of the sections of winding 21, winding 21 draws, from line 6, an increased amount of magnetizing current component of fundamental frequency, as is well known in the art, to produce a third harmonic flux component in core 22. Winding 21 is preferably so designed that such flux component is substantially equal to the flux component normally produced by the flow of load current, thereby causing interphase transformer 19 to continue to operate in the normal manner thereof.

Winding 21 is therefore operable to contribute to the alternating current excitation of core 22 upon accidental direct current magnetic saturation thereof, by cooperating with the currents flowing through the windings of the interphase transformer to excite the core thereof upon occurrence of unbalances in the distribution of such currents. Winding 21 thus maintains the normal operation of interphase transformer 19 upon occurrence of such unbalances.

In the above explanation it was assumed that the alternating current flux produced in core 22 by energization of winding 21 alone was insufficient to bring such core to magnetic saturation. Winding 21 may, however, also be so designed that the alternating current flux produced thereby in core 22 reaches the saturation point. As is well known, winding 21 then draws, from line 6, an increased magnetizing current component of fundamental frequency whereby the alternating current flux of core 22 receives a third harmonic flux component in addition to the fundamental component thereof. The flow of a third harmonic flux component in core 22 is thus adequately provided by winding 21 and is, therefore, independent of conditions in windings 17 and 18. Winding 21 will, therefore, maintain the operation of interphase transformer 19 as well during normal operation as upon occurrence of unbalances in the distribution of current between windings 17 and 18. In addition, when the load current decreases below the minimum value at which such currents would suffice for alone maintaining core 22 magnetized, the so-called critical value, winding 21 maintains core 22 magnetized and interphase transformer 19 continues to operate in the normal manner thereof. Windings 8 and 9 then continue to carry current simultaneously at every instant and the voltage of line 14, 16 remains substantially constant, whereas in the absence of winding 21 the voltage of line 14, 16 would gradually rise to the value corresponding to the value attained in the absence of interphase transformer 19 as the load current decreases to zero.

Although but one embodiment of the present invention has been illustrated and described, it will be apparent to those skilled in the art that various changes and modifications may be made therein without departing from the spirit of the invention or from the scope of the appended claims.

It is claimed and desired to secure by Letters Patent:

1. In combination, an alternating current line, a transformer having a primary winding connected with said line and having a plurality of secondary windings each provided with a neutral point, electron discharge means connected with said secondary windings, an interphase transformer having windings connected between the neutral points of said secondary windings, a direct current line connected with said interphase transformer and with said discharge means, and means for maintaining the operation of said interphase transformer upon occurrence of unbalances in the distribution of current between said secondary windings.

2. In combination, an alternating current line, a transformer having a primary winding connected with said line and having a plurality of secondary windings each provided with a neutral point, electron discharge means connected with said secondary windings, an interphase transformer having windings connected between the neutral points of said secondary windings, a direct current line connected with said interphase transformer and with said discharge means, and means responsive to the occurrence of unbalances in the distribution of current between said secondary windings and cooperating with the current flowing through the windings of said interphase transformer to excite the latter.

3. In combination, an alternating current line, a transformer having a primary winding connected with said line and having a plurality of secondary windings each provided with a neutral point, electron discharge means connected with said secondary windings, a magnetically saturable core structure, an interphase transformer having windings connected between the neutral points of said secondary windings and arranged on said core structure, a direct current line connected with said interphase transformer and with said discharge means, and means operable to contribute to the alternating current excitation of said core upon accidental direct current magnetic saturation thereof.

4. In combination, an alternating current line, a transformer having a primary winding connected with said line and having a plurality of secondary windings each provided with a neutral point, electron discharge means connected with said secondary windings, a direct current line connected with said discharge means, a magnetically saturable core structure, an interphase transformer having a plurality of windings each comprising a plurality of phase displaced sections serially connected in polygon connection between said direct current line and the neutral points of said secondary windings and arranged on said core structure, and a winding comprising a plurality of phase displaced star connected sections arranged on said core structure in inductive relation with the windings of said interphase transformer and energized from said altenating current line.

5. In combination, an alternating current line, a transformer having a primary winding connected with said line and having a plurality of secondary windings each provided with a neutral point, electron discharge means connected with said secondary windings, an interphase transformer having windings connected between the neutral points of said secondary windings, a direct current line connected with said interphase transformer and with said discharge means, and means for maintaining the operation of said interphase transformer upon occurence of unbalances in the distribution of current between said secondary windings and upon decrease of the flow of current through said secondary windings below a predetermined value.

6. In combination, an alternating current line, a transformer having a primary winding connected with said line and having a plurality of secondary windings each provided with a neutral point, electron discharge means connected with said secondary windings, an interphase transformer having windings connected between the neutral points of said secondary windings, a direct current line connected with said interphase transformer and with said discharge means, and means for maintaining the operation of said interphase transformer upon occurrence of unbalances in the distribution of current between said secondary windings and for maintaining the voltage of said direct current line at a substantially constant value at loads below a predetermined value.

7. In combination, an alternating current line, a transformer having a primary winding connected with said line and having a plurality of secondary windings each provided with a neutral point, electron discharge means connected with said secondary windings, a direct current line connected with said discharge means, an interphase transformer having a plurality of windings each comprising a plurality of phase displaced sections serially connected in polygon connection between said direct current line and the neutral points of said secondary windings and arranged on a magnetically saturable core structure, and a winding comprising a plurality of phase displaced star connected sections arranged on said core structure in inductive relation with the windings of said interphase transformer and energized from said alternating current line to produce alternating current magnetic saturation of said core.

HAROLD WINOGRAD.